(12) United States Patent
Galperin et al.

(10) Patent No.: US 7,903,750 B2
(45) Date of Patent: Mar. 8, 2011

(54) SYSTEM AND METHOD FOR DETERMINING TRANSMISSION PARAMETERS IN AN ORTHOGONAL FREQUENCY-DIVISION MULTIPLEXED DATA STREAM

(75) Inventors: Noam Galperin, Ma'a lot (IL); Dor Amos, Givat Ada (IL); Yossef Cohen, Nofit (IL); Itamar Feigenbaum, Kiryat Tivon (IL)

(73) Assignee: Zoran Corporation, Sunnyvale, CA (US)

( * ) Notice: Subject to any disclaimer, the term of this patent is extended or adjusted under 35 U.S.C. 154(b) by 726 days.

(21) Appl. No.: 11/853,457

(22) Filed: Sep. 11, 2007

(65) Prior Publication Data

US 2009/0067515 A1    Mar. 12, 2009

(51) Int. Cl.
*H04K 1/10* (2006.01)
(52) U.S. Cl. ......... 375/260; 375/354; 375/150; 375/345; 375/267; 375/343; 375/326
(58) Field of Classification Search .................... 37/260; 375/260
See application file for complete search history.

(56) References Cited

U.S. PATENT DOCUMENTS

| | | | |
|---|---|---|---|
| 5,166,924 A | 11/1992 | Moose | |
| 6,300,895 B1 | 10/2001 | Carrara et al. | |
| 6,330,293 B1 | 12/2001 | Klank et al. | |
| 6,459,744 B1 | 10/2002 | Helard et al. | |
| 6,470,030 B1 | 10/2002 | Park et al. | |
| 6,687,315 B2 | 2/2004 | Keevill et al. | |
| 7,020,116 B1 * | 3/2006 | Nakada | 370/338 |
| 2002/0034264 A1 | 3/2002 | Vigil | |
| 2004/0184399 A1 | 9/2004 | Chiou | |
| 2004/0240379 A1 | 12/2004 | Tsuie | |
| 2005/0141625 A1 | 6/2005 | Zhang | |
| 2005/0180533 A1 | 8/2005 | Hamman | |
| 2006/0140109 A1 * | 6/2006 | Lin | 370/208 |
| 2006/0146947 A1 | 7/2006 | Kim | |
| 2007/0064586 A1 | 3/2007 | Ma et al. | |
| 2008/0198942 A1 | 8/2008 | Akella et al. | |

OTHER PUBLICATIONS

Brugger et al., "OFDM receivers-impact on coverage of inter-symbol interference and FFT window positioning." EBU Technical Review, Jul. 2003.
Speth et al., "Optimum Receiver Design for OFDM-Based Broadband Transmission-Part II: A Case Study," IEEE Transactions on Communications, vol. 49, No. 4, Apr. 2001.
Huang et al., "Joint Synchronization in Eureka 147 DAB System Based on Abrupt Phase Change Detection," IEEE Journal on Selected Areas in Communications, vol. 17, No. 10, pp. 1770-1780, Oct. 1999.

* cited by examiner

*Primary Examiner* — Shuwang Liu
*Assistant Examiner* — Dhaval Patel
(74) *Attorney, Agent, or Firm* — Lando & Anastasi, LLP (57) ABSTRACT

A system for identifying transmission parameters of an OFDM signal transmitted according to a transmitter clock includes a first correlator to receive and correlate samples of the signal sampled according to a receiver clock and provide a first metric indicative of whether the signal has a first transmission mode, a plurality of additional correlators, operable in parallel with the first correlator, to receive and correlate the samples of the signal sampled according to the receiver clock and provide a plurality of additional metrics indicative of whether the signal has a second transmission mode and whether the receiver clock is aligned with or displaced by at least one sample over one OFDM symbol relative to the transmitter clock, and a processor. The processor receives the metrics, and determines whether the signal has the first or second transmission mode and whether the receiver clock is aligned or displaced by the at least one sample relative to the transmitter clock.

26 Claims, 5 Drawing Sheets

SYSTEM AND METHOD FOR DETERMINING TRANSMISSION PARAMETERS IN AN ORTHOGONAL FREQUENCY-DIVISION MULTIPLEXED DATA STREAM

BACKGROUND

1. Field of the Invention

Aspects of the present invention are directed to the processing of an Orthogonal Frequency-Division Multiplexed signal, and more particularly to a system and method for determining transmission parameters in an Orthogonal Frequency-Division Multiplexed signal in which the determined transmission parameters may additionally be used to determine a coarse FFT window position based thereon.

2. Discussion of the Related Art

In Orthogonal Frequency-Division Multiplexing (OFDM) systems, information such as compressed audio and/or video data is carried via a large number of individual carriers (i.e., sub-carriers) in a frequency multiplex. The frequencies of the sub-carriers are selected so that the modulated data streams are orthogonal to each other, thereby eliminating cross-talk issues. Although each carrier transports only a relatively small amount of information, high data rates may be achieved by using a large number of carriers (e.g., 2048, 4096, 8192, respectively termed 2k, 4k, and 8k mode) multiplexed together. The individual carriers are modulated (e.g., using phase-shift keying (PSK) techniques, or amplitude modulation techniques, such as Quadrature Amplitude Modulation (QAM)), with each carrier having a fixed phase and amplitude for a certain time duration, during which a small portion of the information is carried. That small portion of information is called a symbol, and the time period for which it lasts is called the symbol duration. The modulation is then changed and the next symbol carries the next portion of information. Examples of known OFDM systems include DVB-T (Digital Video Broadcasting-Terrestrial) Standard systems, DVB-H (Digital Video Broadcasting-Handheld) Standard systems, T-DAB (Terrestrial-Digital Audio Broadcasting) Standard systems, 3G and 4G mobile phone wireless network systems, as well as others.

In OFDM systems, modulation and demodulation are performed using the Inverse Fast Fourier Transformation (IFFT) and the Fast Fourier Transformation (FFT), respectively. The time duration of a symbol is the inverse of the carrier frequency spacing, thereby ensuring orthogonality between the carriers. In addition to the data that is carried by an OFDM signal, additional signals, termed 'pilot signals' (whose value and position are defined in the applicable standard, and are thus known by the receiver) are inserted into each block of data for measurement of channel conditions and also for synchronization.

In order to overcome inter-symbol interference, a portion of each symbol (e.g., the first portion or the last portion) is copied and appended to the beginning or end of the symbol. For example, in DVB-T standard systems, the last portion of the symbol is copied and appended to the beginning of the symbol as a cyclic prefix. In OFDM systems, and as used herein, that copied portion of the symbol is termed the "guard interval" and its duration (or length) is typically denoted L, the duration of the original symbol (i.e., the "useful symbol duration") is typically denoted $T_U$, and the increased symbol duration is typically denoted $T_S$, where $T_S=T_U+L$. Provided that most (or ideally all) echo energy from a prior symbol falls within the guard interval, the symbol may still be recovered.

In an OFDM receiver, the received OFDM signal is demodulated to baseband using some type of quadrature amplitude demodulation or phase shift keying demodulation, the resultant baseband signals are then typically low-pass filtered, and the filtered baseband signals are then sampled and digitized using analog to digital converters (ADCs). After removal of the guard interval, the digitized signals are then provided to an FFT module and converted back to the frequency domain. Because of the presence of the guard interval, a nearly infinite number of options exist as to where to place the FFT window to evaluate the symbol. In general, it is desired to place the FFT window on the useful part of the symbol ($T_U$), and so that all or nearly all echo energy lies within the guard interval (L) of the symbol.

One system and method for determining the placement of an FFT window on the useful part of a symbol ($T_U$) so that all, or nearly all, echo energy lies within the guard interval (L) of the symbol is described in commonly owned U.S. patent application Ser. No. 11/731,791, filed on Mar. 30, 2007 by Itamar Gold-Gavrieli et al. and entitled SYSTEM AND METHOD FOR FFT WINDOW TIMING SYNCHRONIZATION FOR AN ORTHOGONAL FREQUENCY-DIVISION MULTIPLEXED DATA STREAM (hereinafter "the co-pending application"), which is incorporated herein by reference in its entirety. Although the system and method described in the co-pending application may be used to accurately determine an optimal placement of the FFT window, this ability is premised on the system's knowledge of the transmission mode (e.g., 2K mode, 4K mode, 8K mode) and the guard interval of the OFDM signal.

SUMMARY OF THE INVENTION

Embodiments of the present invention are directed to a system and method of determining transmission parameters in an Orthogonal Frequency-Division Multiplexed signal, which parameters may then be used to determine a coarse FFT window position based thereon. As used herein, the term "transmission parameters" includes parameters such as the transmission mode (e.g., 2K, 4K, 8K) and the Guard Interval (L) of the OFDM signal. Advantageously, the coarse FFT window position may be further adjusted, for example, using pulse response estimation as described in the co-pending application, to provide an optimal FFT window position that includes substantially all of the useful data of a symbol and so that any appreciable echo energy is confined to within the guard interval of the symbol.

In accordance with one aspect of the present invention, a system for identifying transmission parameters of an OFDM signal transmitted in accordance with a transmitter clock is provided. The system comprises a first correlator, a plurality of additional correlators, and a processor. The first correlator is configured to receive and correlate samples of the OFDM signal sampled in accordance with a receiver clock and to provide a first metric indicative of whether the OFDM signal has a first transmission mode of a plurality of permissible transmission modes for the OFDM signal. The plurality of additional correlators are operable in parallel with the first correlator, and configured to receive and correlate the samples of the OFDM signal sampled in accordance with the receiver clock and to provide a plurality of additional metrics indicative of whether the OFDM signal has a second transmission mode of the plurality of permissible transmission modes for the OFDM signal and whether the receiver clock is one of aligned with the transmitter clock or displaced by at least one sample over one OFDM symbol relative to the transmitter clock. The processor is configured to receive the first metric and the plurality of additional metrics, and based upon the first metric and the plurality of additional metrics, to determine whether the OFDM signal has one of the first transmission mode or the second transmission mode, and when the OFDM signal has the second transmission mode, to additionally determine whether the receiver clock is the one of aligned with the transmitter clock or displaced by the at least one sample over one OFDM symbol relative to the transmitter clock.

In one embodiment, the processor, in response to a determination that the receiver clock is displaced by the at least one sample over one OFDM symbol relative to the transmitter clock, is further configured to provide a signal to adjust the receiver clock by the at least one sample over one OFDM symbol to align the receiver clock with the transmitter clock.

In another embodiment, the plurality of additional correlators includes a second correlator to receive and correlate samples of the OFDM signal sampled in accordance with the receiver clock and to provide a second metric indicative of whether the OFDM signal has the second transmission mode and whether the receiver clock is aligned with the transmitter clock, a third correlator to receive and correlate the samples of the OFDM signal sampled in accordance with the receiver clock but offset the at least one sample over one OFDM symbol ahead of the samples of the OFDM signal received and correlated by the second correlator and to provide a third metric indicative of whether the OFDM signal has the second transmission mode and whether the receiver clock is displaced the at least one sample over one OFDM symbol ahead of the transmitter clock, and a fourth correlator to receive and correlate the samples of the OFDM signal sampled in accordance with the receiver clock but offset the at least one sample over one OFDM symbol behind the samples of the OFDM signal received and correlated by the second correlator and to provide a fourth metric indicative of whether the OFDM signal has the second transmission mode and whether the receiver clock is displaced the at least one sample over one OFDM symbol behind the transmitter clock.

In accordance with another aspect of the present invention, the first, second, third, and fourth correlators are configurable correlators. In accordance with this aspect, the processor is configured to receive the first metric, the second metric, the third metric, and the fourth metric, to determine whether the OFDM signal has the one of the first transmission mode or the second transmission mode, and based upon the determined transmission mode, to reconfigure the first configurable correlator to receive and correlate the samples of the OFDM signal according to the determined transmission mode and to provide a fifth metric indicative of whether the OFDM signal has a first guard interval of a plurality of permissible guard intervals for the OFDM signal, and to reconfigure the second configurable correlator to receive and correlate the samples of the OFDM signal according to the determined transmission mode and to provide a sixth metric indicative of whether the OFDM signal has a second guard interval of the plurality of permissible guard intervals for the OFDM signal. In accordance with one exemplary embodiment, the processor reconfigures the second configurable correlator to receive and correlate the samples of the OFDM signal according to the determined transmission mode in parallel with the receipt and correlation performed by the first configurable correlator.

In accordance with a further aspect of this embodiment, the processor is further configured to reconfigure the third configurable correlator to receive and correlate, in parallel with the first and second configurable correlators, the samples of the OFDM signal according to the determined transmission mode and to provide a seventh metric indicative of whether the OFDM signal has a third guard interval of a plurality of permissible guard intervals for the OFDM signal, and to reconfigure the fourth configurable correlator to receive and correlate, in parallel with the first, second, and third configurable correlators, the samples of the OFDM signal according to the determined transmission mode and to provide a eighth metric indicative of whether the OFDM signal has a fourth guard interval of the plurality of permissible guard intervals for the OFDM signal. In accordance with a still further aspect of this embodiment, the processor is further configured to receive the fifth metric, the sixth metric, the seventh metric, and the eighth metric and to determine whether the OFDM signal has one of the first guard interval, the second guard interval, the third guard interval, or the fourth guard interval.

In accordance with another aspect of the present invention, after determining whether the OFDM signal has the one of the first transmission mode or the second transmission mode, and whether the OFDM signal has the one of the first guard interval, the second guard interval, the third guard interval, or the fourth guard interval, the processor is further configured to reconfigure one of the first, second, third, and fourth configurable correlators to receive and correlate the samples of the OFDM signal according to the determined transmission mode and the determined guard interval. In accordance with one embodiment, the one of the first, second, third, and fourth configurable correlators is reconfigured to receive the samples of the OFDM signal at a first input, to receive the samples of the OFDM signal delayed by a length of a useful symbol duration corresponding to the determined transmission mode at a second input, to receive the samples of the OFDM signal delayed by a length of the determined guard interval duration at a third input, and to receive the samples of the OFDM signal delayed by the length of the useful symbol duration and the length of the determined guard interval duration at a fourth input, and to provide an output signal indicative of a correlation among the samples of the OFDM signal during a sample period.

In accordance with this embodiment, the system may further comprise a delay memory, and an arithmetic module. The delay memory is coupled to receive the output signal of the correlator and to delay the output signal of the correlator by the length of the determined guard interval duration, by twice the length of the determined guard interval duration, and by three times the length of the determined guard interval duration and provide respective delayed output signals corresponding thereto. The arithmetic module receives the output signal of the correlator and the respective delayed output signals of the delay memory, and determines a first average of a sum of the output signal of the correlator and the output signal of the correlator delayed by the length of the determined guard interval duration, a second average of a sum of the output signal of correlator and the output signal of the correlator delayed by twice the length of the determined guard interval duration, and a third average of a sum of the output signal of the correlator and the output signal of the correlator delayed by three times the length of the determined guard interval duration. In this embodiment, the processor is further configured to receive the first, second and third averages and determine an approximate FFT window location to extract data from the OFDM signal based upon a maximum of the first, second, and third averages.

In accordance with another aspect of the present invention, a method for identifying transmission parameters of an OFDM signal transmitted in accordance with a transmitter clock is provided. The OFDM signal has a transmission mode selected from among a plurality of permissible transmission modes, and the method comprises acts of: (a) correlating samples of the OFDM signal sampled in accordance with a receiver clock to provide a first metric indicative of whether the OFDM signal has a first transmission mode of the plurality of permissible transmission modes; (b) correlating the samples of the OFDM signal sampled in accordance with the receiver clock to provide a plurality of additional metrics indicative of whether the OFDM signal has a second transmission mode of the plurality of permissible transmission modes and whether the receiver clock is one of aligned with the transmitter clock or displaced by at least one sample over one OFDM symbol relative to the transmitter clock; and (c) determining, based upon the first metric and the plurality of additional metrics, whether the OFDM signal has one of the first transmission mode or the second transmission mode, and when the OFDM signal has the second transmission mode, additionally determining whether the receiver clock is the one of aligned with the transmitter clock or displaced by the at least one sample over one OFDM symbol relative to the transmitter clock; wherein the acts (a) and (b) are performed in parallel with one another.

In accordance with one embodiment, the method may further comprise an act of adjusting, in response to a determination that the receiver clock is displaced by the at least one sample over one OFDM symbol relative to the transmitter clock, the receiver clock by the at least one sample over one OFDM symbol to align the receiver clock with the transmitter clock.

In accordance with another embodiment, the act (b) may include acts of: (d) correlating the samples of the OFDM signal sampled in accordance with the receiver clock to provide a second metric indicative of whether the OFDM signal has the second transmission mode and whether the receiver clock is aligned with the transmitter clock; (e) correlating the samples of the OFDM signal sampled in accordance with the receiver clock but offset the at least one sample over one OFDM symbol ahead of the samples of the OFDM signal correlated in act (d) to provide a third metric indicative of whether the OFDM signal has the second transmission mode and whether the receiver clock is displaced the at least one sample over one OFDM symbol ahead of the transmitter clock; and (f) correlating the samples of the OFDM signal sampled in accordance with the receiver clock but offset the at least one sample over one OFDM symbol behind the samples of the OFDM signal correlated in act (d) to provide a fourth metric indicative of whether the OFDM signal has the second transmission mode and whether the receiver clock is displaced the at least one sample over one OFDM symbol behind the transmitter clock.

In accordance with a still further embodiment, wherein the acts (a), (d), (e), and (f) are performed by first, second, third, and fourth configurable correlators, respectively, the method may further comprise an act of reconfiguring, responsive to a determination in act (c) that the OFDM signal has a determined one of the first transmission mode or the second transmission mode, each of the first, second, third, and fourth configurable correlators to correlate the samples of the OFDM signal according to the determined transmission mode and to provide respective fifth, sixth, seventh, and eighth metrics indicative of whether the OFDM signal has a first guard interval, a second guard interval, a third guard interval, and a fourth guard interval, respectively, of a plurality of permissible guard intervals for the OFDM signal. In accordance with this embodiment, the method may further comprise an act of determining, based upon the fifth metric, the sixth metric, the seventh metric, and the eighth metric whether the OFDM signal has one of the first guard interval, the second guard interval, the third guard interval, or the fourth guard interval.

In accordance with another aspect of the present invention, a system and method for identifying transmission parameters of an OFDM signal transmitted in accordance with a transmitter clock is provided. The system comprises a first correlator, at least one additional correlator, and a processor. In one embodiment, the first correlator is configured to receive and correlate samples of the OFDM signal sampled in accordance with a receiver clock and to provide a first metric indicative of whether the OFDM signal has a first transmission mode of a plurality of permissible transmission modes for the OFDM signal and whether the receiver clock is aligned with the transmitter clock. The at least one additional correlator is configured to receive and correlate the samples of the OFDM signal sampled in accordance with the receiver clock but offset by at least one sample over one OFDM symbol relative to the samples of the OFDM signal received and correlated by the first correlator and to provide at least one additional metric indicative of whether the OFDM signal has the first transmission mode and whether the receiver clock is displaced by the at least one sample over one OFDM symbol relative to the transmitter clock. The processor is configured to receive the first metric and the at least one additional metric, and based upon the first metric and the at least one additional metric, to identify whether the OFDM signal has the first transmission mode and whether the receiver clock is one of aligned with the transmitter clock or displaced by the at least one sample over one OFDM symbol relative to the transmitter clock.

In accordance with this aspect of the present invention, the method comprises acts of: correlating samples of the OFDM signal sampled in accordance with a receiver clock to provide a first metric indicative of whether the OFDM signal has a first transmission mode of the plurality of permissible transmission modes and whether the receiver clock is aligned with the transmitter clock; correlating the samples of the OFDM signal offset by at least one sample over one OFDM symbol relative to the receiver clock to provide at least one additional metric indicative of whether the OFDM signal has the first transmission mode and whether the receiver clock is offset by the at least one sample over one OFDM symbol relative to the transmitter clock; and identifying, based upon the first metric and the at least one additional metric, whether the transmission mode of the OFDM signal is the first transmission mode and whether the receiver clock is displaced by the at least one sample over one OFDM symbol relative to the transmitter clock.

In accordance with yet another aspect of the present invention, a system and method for synchronizing on an OFDM signal having a transmission mode selected from among a plurality of permissible transmission modes and a guard interval selected from among a plurality of permissible guard intervals is provided. The system comprises a first configurable correlator, a second configurable correlator, and a processor. The first configurable correlator is configured to receive and correlate samples of the OFDM signal and to provide a first metric indicative of whether the OFDM signal has a first transmission mode of the plurality of permissible transmission modes for the OFDM signal. The second configurable correlator is disposed in parallel with the first configurable correlator and configured to receive and correlate the samples of the OFDM signal and provide a second metric indicative of whether the OFDM signal has a second transmission mode of the plurality of permissible transmission modes for the OFDM signal. The processor is configured to receive the first metric and the second metric, to determine whether the OFDM signal has the first transmission mode or the second transmission mode, and based upon the determined transmission mode, to reconfigure the first configurable correlator to receive and correlate the samples of the OFDM signal according to the determined transmission mode and to provide a third metric indicative of whether the OFDM signal has a first guard interval of the plurality of permissible guard intervals for the OFDM signal, and to reconfigure second configurable correlator to receive and correlate the samples of the OFDM signal according to the determined transmission mode and to provide a fourth metric indicative of whether the OFDM signal has a second guard interval of the plurality of permissible guard intervals for the OFDM signal.

In accordance with this aspect of the present invention, the method comprises acts of: configuring a first correlator to correlate samples of the OFDM signal and provide a first metric indicative of whether the OFDM signal has a first transmission mode of the plurality of permissible transmission modes for the OFDM signal; configuring a second correlator to correlate, in parallel with the first correlator, the samples of the OFDM signal and provide a second metric indicative of whether the OFDM signal has a second transmission mode of the plurality of permissible transmission modes for the OFDM signal; determining, based upon the first metric and the second metric, whether the OFDM signal has the first transmission mode or the second transmission mode; reconfiguring, responsive to the act of determining, the first correlator to correlate the samples of the OFDM signal according to the determined transmission mode to provide a third metric indicative of whether the OFDM signal has a first guard interval of the plurality of permissible guard intervals for the OFDM signal; and reconfiguring, responsive to the act of determining, the second correlator to correlate, in parallel with the first correlator, the samples of the OFDM signal according to the determined transmission mode and provide a fourth metric indicative of whether the OFDM signal has a second guard interval of the plurality of permissible guard intervals for the OFDM signal.

In accordance with yet a further aspect of the present invention, a system for determining an FFT window location for extracting data in an OFDM signal is provided for an OFDM signal that includes a plurality of symbols each having a useful symbol duration and a guard interval duration. The system comprises a correlator, a delay memory, an arithmetic module, and a processor. The correlator has first input to receive samples of the OFDM signal, a second input to receive the samples of the OFDM signal delayed by a length of the useful symbol duration, a third input to receive the samples of the OFDM signal delayed by a length of the guard interval duration, and a fourth input to receive the samples of the OFDM signal delayed by the length of the useful symbol duration and the length of the guard interval duration, with the correlator providing an output signal indicative of a correlation among the samples of the OFDM signal during a sample period. The delay memory is coupled to the correlator to receive the output signal of the correlator and to delay the output signal of the correlator by the length of the guard interval duration, by twice the length of the guard interval duration, and by three times the length of the guard interval duration. The arithmetic module is coupled to the correlator and the delay memory to receive the output signal of the correlator and the delayed output signals of the delay memory, and to determine a first average of a sum of the output signal of the correlator and the output signal of the correlator delayed by the length of the guard interval duration, a second average of a sum of the output signal of correlator and the output signal of the correlator delayed by twice the length of the guard interval duration, and a third average of a sum of the output signal of the correlator and the output signal of the correlator delayed by three times the length of the guard interval duration. The processor is coupled to the arithmetic module to receive the first, second, and third averages and to determine the FFT window location based upon a maximum of the first, second, and third averages.

In accordance with a still further aspect of the present invention, a system for synchronizing on an OFDM signal received over a transmission channel is provided. The system comprises a plurality of configurable correlators and a processor. Each of the plurality of configurable correlators is programmed to receive and correlate, in parallel with one another, samples of the OFDM signal and to provide a corresponding plurality of metrics, each metric being indicative of a respective transmission mode of a plurality of permissible transmission modes for the OFDM signal. The processor is coupled to the plurality of configurable correlators to receive the plurality of metrics and determine which of the plurality of permissible transmission modes the OFDM signal has, and to reconfigure each of the plurality of configurable correlators to receive and correlate, in parallel with one another, the samples of the OFDM signal according to the determined transmission mode and to provide a respective metric indicative of whether the OFDM signal has a respective guard interval of a plurality of permissible guard intervals for the OFDM signal.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Various embodiments and aspects thereof will now be described in more detail with reference to the accompanying figures. It is to be appreciated that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

As used herein, the term "data" refers to physical signals that indicate or include information. The term "data" includes data existing in any physical form, and includes data that are transitory or are being stored or transmitted. For example, data may exist as electromagnetic or other transmitted signals or as signals stored in electronic, magnetic, or other form.

A "memory" is a physical medium that can store data. Examples of memories include magnetic media such as diskettes, floppy disks, and tape; optical media such Magneto-Optic disks, CDs, and DVDs; and semiconductor media such as semiconductor ROMs, RAMs, etc.

A display device refers to a device that can receive audio and/or video data and provide a representation of that data in a human perceptible form. Examples of display devices include screen display devices such as televisions, computer monitors, PDA or cell phone screens, projection display devices, etc., as well as audio display devices such as radios and other types of audio systems.

Although embodiments of the present invention described herein are primarily directed to receiving a DVB-T Standard OFDM signal, it will be appreciated that the systems and method described herein are applicable to other types of OFDM signals, including those pertaining to DVT-H Standard systems, T-DAB Standard systems, T-DMB (Terrestrial-Digital Multimedia Broadcasting) Standard Systems, 3G and 4G mobile phone wireless network systems, as well as other types of OFDM systems.

Figure 1:
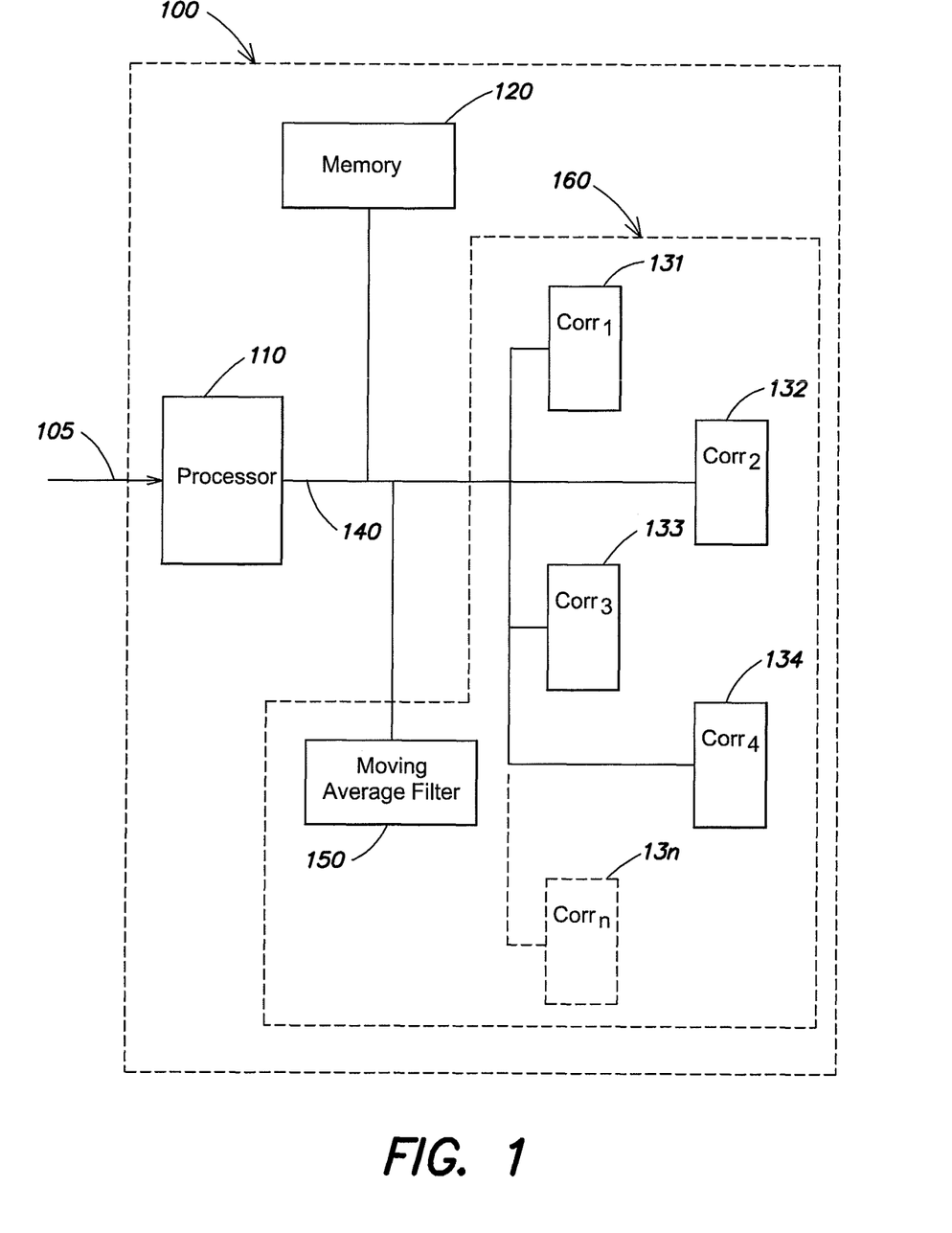
FIG. 1 is a functional block diagram of a transmission parameter detection device that includes a plurality of configurable correlators and a moving average filter in accordance with one embodiment of the present invention.

FIG. 1 is a functional block diagram of a transmission parameter detection device in accordance with one embodiment of the present invention. As described in detail further below, the transmission parameter detection device 100 is adapted to receive digitized samples of an OFDM signal, and determine the transmission mode (e.g., 2K mode, 4K mode, 8K mode) and the guard interval (e.g., ¼, ⅛, 1/16, 1/32) of the received OFDM signal. In addition to determining the transmission mode and the guard interval, the transmission parameter detection device is also capable of determining whether the receiver clock by which the OFDM signal is demodulated and symbols in the OFDM signal are sampled is offset with respect to the transmitter clock.

In accordance with one embodiment of the present invention, the determination of the transmission mode of the received OFDM signal is performed in parallel with the determination of the clock offset during a first phase of a transmission parameter detection process. In a next phase of the transmission parameter detection process, the guard interval of the received OFDM signal is determined based upon the transmission mode determined in the prior phase, and in a further phase of the transmission parameter detection process, a coarse FFT window position is determined based upon the previously determined transmission mode and guard interval of the OFDM signal.

In a practical implementation, the transmission parameter detection device 100 may be part of a larger system or device, such as a Set Top Box (STB), a High Definition (HD) Television, or radio, that receives digitized samples of an OFDM signal (such as a DVB-T, DVB-H, T-DMB, or T-DAB OFDM signal) received from a tuner section of the device via satellite, from a wireless transmitter, or from a physical transmission media, such as coaxial cable. It should be appreciated that the device or system in which the transmission parameter detection device 100 is implemented need not be a stationary device, but could alternatively be a portable device such as a mobile phone, a laptop computer, or a PDA.

As depicted in FIG. 1, the transmission parameter detection device 100 is adapted to receive digitized samples of the received OFDM signal 105 and includes a processor 110, a memory 120, and a plurality of configurable correlators 131, 132, 133, 134, 13$n$ coupled together via a bus 140. In accordance with an embodiment of the present invention, the transmission parameter detection device 100 may also include a moving average filter 150 coupled to the processor 110, the memory 120, and the plurality of configurable correlators 131-13$n$ via the bus 140.

The processor 110 may be a programmable general purpose Digital Signal Processor (DSP), available from companies such as Analog Devices, Motorola, or Texas Instruments, or an application specific DSP designed for a particular application and provided by a company such as Zoran Corporation. The memory 120 generally includes a combination of RAM memory and ROM memory, but may also include other types of memory, such as flash or disk-based memory, etc. In accordance with embodiments of the present invention, the memory 120 may be adapted to store instructions for the processor 110, as well as digitized samples of the received OFDM signal for access by the processor 110 and the correlators 131-13$n$.

In accordance with one embodiment, the plurality of configurable correlators 131-13$n$ are predominantly implemented in hardware in an integrated circuit, such as a Programmed or Programmable Gate Array (PGA). Portions of the moving average filter 150 may similarly be implemented in hardware, such as a PGA, which may be the same PGA as that in which the plurality of configurable correlators are implemented (as shown in phantom at 160), or separate therefrom. It should be appreciated that the correlators 131-13$n$, and/or the moving average filter 150 could alternatively be implemented in software executed by the processor 110 in combination with the memory 120 either alone, or in combination with some associated logic elements.

In accordance with one embodiment of the present invention that is specifically adapted for use in detecting transmission parameters associated with a DVB-T Standard OFDM signal, the plurality of configurable correlators 131-13$n$ may include four configurable correlators 131, 132, 133, and 134 disposed and operable in parallel with one another. As will be described in detail further below, the use of four configurable correlators to detect the transmission parameters of a DVB-T Standard OFDM signal permits all allowable transmission modes of the DVB-T Standard OFDM signal to be correlated in parallel with one another during a first phase of the process, and permits all allowable guard intervals of the DVB-T Standard OFDM signal to be correlated in parallel with one another during a second phase of the process. This utilization of four configurable correlators operable in parallel with one another allows the transmission parameters to be determined significantly faster than if a lesser number of configurable correlators were used, while not requiring a large number of dedicated correlators (e.g., a dedicated correlator for each allowable combination of transmission mode and guard interval). It should be appreciated that in other embodiments, and for use with other types of OFDM signals that include a different number of allowable transmission modes, more (as shown in phantom by correlator 13n in FIG. 1) or fewer correlators could be provided, as discussed further in detail below.

During the transmission parameter detection process, the processor 110 receives digitized samples of the received OFDM signal, for example from a tuner section of a Set Top Box, a television or other display device, and stores the digitized samples of the received OFDM signal in memory 120 for use by the plurality of configurable correlators 131-134. In a first phase of the transmission parameter detection process, each of the four configurable correlators 131-134 is configured to detect a particular transmission mode of the received OFDM signal in parallel with the other correlators. In accordance with an embodiment of the present invention that is specifically adapted to detect the transmission mode of a received DVB-T Standard OFDM signal (in which only 2K and 8K transmission modes are permitted by the Standard), a first of the correlators, e.g., correlator 131 is configured to detect the 2K mode, and the remaining correlators, e.g., correlators 132, 133, and 134 are configured to detect the 8K transmission mode. In accordance with an aspect of the present invention, in addition to detecting whether the transmission mode of the received OFDM signal is the 8K mode, two of the remaining correlators 132, 133, and 134 are also used to detect whether the receiver symbol clock is offset by at least one sample over one OFDM symbol relative to the transmitter symbol clock. In one embodiment, this detection of symbol clock offset is performed simultaneously with the detection of the particular transmission mode.

During the first phase of the transmission parameter detection process, a first correlator, for example, correlator 131, is configured to correlate digitized samples of the received OFDM signal that are spaced apart from one another by a useful symbol length ($T_U$) of the received OFDM signal, based upon the useful symbol length ($T_U$) of a 2K transmission mode OFDM signal (stated alternatively, the correlator 131 is configured to correlate digitized samples of the received OFDM signal spaced apart from one another by an FFT length corresponding to a 2K transmission mode). During this first phase, the remaining correlators, for example correlators 132, 133, and 134 are configured to correlate, in parallel with the first correlator 131, the same digitized samples of the received OFDM signal that are spaced apart from one another by a useful symbol length ($T_U$), but based upon the useful symbol length ($T_U$) of a 8K transmission mode OFDM signal (i.e., spaced apart from one another by an FFT length corresponding to an 8K transmission mode). However, of the three remaining correlators 132, 133, and 134, one of the correlators, e.g., correlator 132, is configured to detect the 8K transmission mode with no clock offset, while each of the remaining correlators, e.g., 133 and 134 is configured to detect the 8K transmission mode offset by plus or minus one sample over one OFDM symbol, respectively, relative to the correlator configured to detect the 8K transmission mode with no clock offset, e.g., correlator 132.

In this first phase of the transmission parameter detection process, each of the correlators 131-134 is configured to use a default guard interval that is the minimum allowed guard interval for the OFDM signal. In one embodiment, and as described further in detail with respect to FIG. 2 below, each of the correlators 131-134 determines a moving average, over the default guard interval, of a sum of the correlation between digitized samples of the OFDM signal spaced apart from one another by the useful symbol length ($T_U$), according to the useful symbol length ($T_U$) of the transmission mode being detected. Thus, for example, where the transmission parameter detection process is used to detect a DVB-T Standard OFDM signal, each of the correlators is configured to utilize a guard interval of ⅟32 (the minimum length of the guard interval allowed by the DVB-T Standard) over which it determines the moving average correlation. In the DVB-T Standard, the ratio of the length (duration) of the guard interval (L) relative to the length (duration) of the useful symbol ($T_U$), termed the 'Guard Length Ratio,' may be ¼, ⅛, ⅟16, or ⅟32, meaning that the increased symbol length ($T_S$) is 1 part guard interval to 4 parts useful data, 1 part guard interval to 8 parts useful data, etc. The use of the minimum allowable guard interval during the first phase of the process provides a good correlation of the received signal regardless of which of the allowable guard intervals was actually transmitted.

During the first phase of the transmission parameter detection process, each of the correlators 131-134 provides a metric (e.g., a moving average) indicative of the degree of correlation between digitized samples of the OFDM signal spaced apart from one another by the useful symbol length ($T_U$) of the transmission mode being detected. These metrics, which in one embodiment may first be low-pass filtered, are provided to the processor 110 which determines, based upon the metrics, which of the correlators 131-134 exhibits the strongest correlation. In one embodiment, to determine which of the correlators exhibits the strongest correlation, the processor 110 performs a search operation on the output of each correlator to identify the location of maximum correlation within each OFDM symbol (e.g., a location index having a value between 0 and the length (i.e., $T_U$+L) of the OFDM symbol—1, based upon the length of the symbol (i.e., the useful length of the symbol ($T_U$) plus the guard interval (L) for the particular mode being detected by the correlator). In this embodiment, the processor 110 then computes an average of the maximum value for several OFDM symbols for each correlator, with the correlator having the highest average being determined to exhibit the strongest correlation.

Thus, in the example described above, if the first correlator 131 exhibits the strongest correlation, the processor 110 determines that the transmission mode of the received OFDM signal is a 2K transmission mode. Alternatively, if one of the remaining correlators 132, 133, 134 exhibits the strongest correlation, then the processor 110 determines that the transmission mode of the received OFDM signal is an 8K transmission mode. It should be appreciated that if one of the correlators 133 or 134 exhibits the strongest correlation, then the processor 110 may not only determine that the transmission mode of the received OFDM signal is an 8K transmission mode, but may further determine that the receiver symbol clock is offset by at least one sample over one OFDM symbol relative to the transmitter symbol clock. Upon such a determination, the processor 110 may provide a signal to the tuner section of the device that the receiver clock is offset by one sample over one OFDM symbol relative to the transmitter clock, to permit the tuner to better demodulate and sample the received OFDM signal. Where the processor 110 is also used to control the tuner section of the device, the processor 110 may directly adjust the receiver's symbol clock to compensate for the detected offset.

During a second phase of the transmission parameter detection process, each of the correlators 131-134 is re-configured, based upon the transmission mode determined in the first phase of the process, to correlate the digitized samples of the received OFDM signal and determine the guard interval of the received OFDM signal. In accordance with an aspect of the present invention, each of the correlators 131-134 may utilize the same data previously used to detect the transmission mode of the received OFDM signal. However, during this second phase, each of the correlators 131-134 determines a moving average of a sum of the correlation between digitized samples of the received OFDM signal spaced apart from one another by a useful symbol length of the determined mode (i.e., determined in the first phase) over a different sized window that corresponds to one of the allowable guard intervals. Thus, for example, in the second phase of the transmission parameter detection process, correlator 131 is configured to determine a moving average sum of the correlation between digitized samples of the received OFDM signal spaced apart from one another by a useful symbol length of the determined mode over a window that is a ¼ guard interval in length, while correlators 132-134 are configured to do determine a similar moving average correlation sum over windows that correspond to other allowable guard intervals, i.e., guard intervals of ⅛, ​1/16, and ​1/32.

In accordance with an embodiment of the invention, this second phase of the transmission parameter detection process is performed in parallel, and on the same data, by each of the correlators 131-134, with each correlator providing a metric indicative of the degree of correlation between the digitized samples of the received OFDM signal over a particular guard interval. These metrics, which again may first be low-pass filtered, are provided to the processor 110 which determines, based upon the metrics, which of the correlators exhibits the strongest correlation.

In one embodiment, to determine which of the correlators exhibits the strongest correlation, the processor 110 again performs a search operation on the output of each correlator to identify the location of maximum correlation within each OFDM symbol (e.g., a location index having a value between 0 and the length (i.e., $T_U$+L) of the OFDM symbol—1, based upon the length of the symbol (i.e., the useful length of the symbol ($T_U$) plus the guard interval (L) for the determined mode and the particular guard interval being detected by the correlator). In this embodiment, the processor 110 again computes an average of the maximum value for several OFDM symbols for each correlator. However, because each of the correlators 131-134 will exhibit a relatively high degree of correlation, the processor 110 further computes a normalized average of the maximum value for the several OFDM symbols for each correlator. In one embodiment, the normalized average value for each correlator is computed by dividing the average of the maximum value for the several OFDM symbols by the standard deviation of the maximum value index for the several OFDM symbols (e.g., {average maximum value}/{standard deviation of the maximum value index}) for each correlator 131-134. Applicants have found that the use of the normalized average value is more robust than simply utilizing the average of the maximum value as was done during the first phase, particularly in the presence of Additive White Gaussian Noise (AWGN) and multipath channel interference. The correlator corresponding to the highest normalized average value is then determined to exhibit the strongest correlation. Thus, in the example above, if the second correlator 132 which was configured to perform a moving average over a ⅛ guard interval exhibits the strongest correlation, the processor 110 would determine that the guard interval of the received OFDM signal was ⅛.

In accordance with an embodiment of the present invention, after determining the transmission mode, the clock offset (if any), and the guard interval of the received OFDM signal, the processor may further configure one of the configurable correlators 131-134 to the determined transmission mode and the determined guard interval and thereby determine a coarse FFT widow position by which to evaluate the received OFDM signal. During this third phase, one of the correlators 131-134 is configured to determine a moving average, over a window that is the determined guard interval in length, of a sum of the correlation between digitized samples of the received OFDM signal that are spaced apart from one another by the useful symbol length of the determined transmission mode. This metric indicative of the degree of correlation may be used by the moving average filter 150 (see FIG. 1) to determine a coarse FFT window position, as described in detail with respect to FIGS. 3, 4, 6A, and 6B more fully below.

Figure 2:
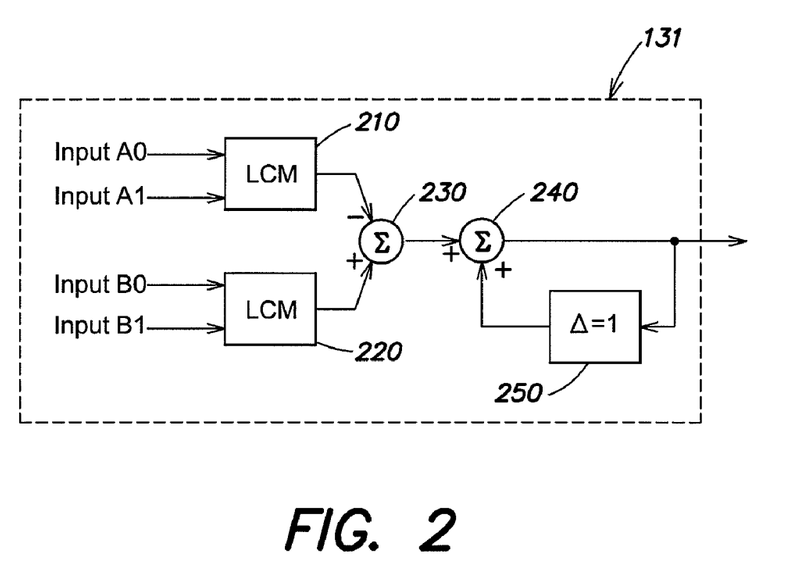
FIG. 2 is an exemplary functional implementation of a configurable correlator that may be used to determine transmission parameters in the transmission parameter detection device of FIG. 1.

FIG. 2 is an exemplary functional implementation of a configurable correlator 131 that may be used to determine transmission parameters of a received OFDM signal in accordance with one embodiment of the present invention. Although the correlator described with respect to FIG. 2 is identified by reference number as the first correlator 131 previously described with respect to FIG. 1, it should be appreciated that each of the other correlators 132-13n may, and preferably do, have a similar structure. In the embodiment depicted in FIG. 2, the correlator 131 performs a moving average, over a configurable length window, of a sum of the correlation between digitized samples of the received OFDM signal that are spaced apart from one another by a configurable number of samples corresponding to the useful symbol length ($T_U$) of a particular transmission mode being detected.

As illustrated in FIG. 2, the correlator 131 includes a first multiplier 210 and a second multiplier 220 each having a pair of inputs (denoted A0, A1 and B0, B1) to receive digitized samples of the serial bitstream spaced apart from one another by the useful symbol length of a particular transmission mode, with the digitized samples received by the first multiplier 210 being spaced apart from those received by the second multiplier 220 by a configurable length interval (which in practice, is a multiple of an allowable guard interval). Each multiplier 210, 220 performs a Logic Complex Multiply (LCM) operation on pairs of samples of the digitized serial bitstream in the manner described further in detail below with respect to Table I below.

In accordance with an embodiment of the present invention, the demodulated and digitized sampled bitstream may be represented as signed complex numbers derived from the analog broadcast data of the received OFDM signal. These signed complex numbers may be quantized and represented by 2 bits per sample, of the constellation +1/2 (digital 0) and −1/2 (digital 1). Thus, for example, the quantity +1/2 −1/2i would be represented as a digital (0, 1) and the quantity −1/2 +1/2i would be represented as a digital (1,0). To multiply complex numbers represented in this manner, a Logic Complex Multiply operation, conj(Input A0)*(Input A1) or conj (Input B0)*(Input B1), may be performed, as detailed in the truth table set forth in Table I.

TABLE I

| | Input A0 (B0) | | | |
|---|---|---|---|---|
| Input A1 (B1) | 0, 0 | 0, 1 | 1, 0 | 1, 1 |
| 0, 0 | 01, 00 | 00, 11 | 00, 01 | 11, 00 |
| 0, 1 | 00, 01 | 01, 00 | 11, 00 | 00, 11 |
| 1, 0 | 00, 11 | 11, 00 | 01, 00 | 00, 01 |
| 1, 1 | 11, 00 | 00, 01 | 00, 11 | 01, 00 |

Thus, for example, if input A0 (or B0) is 0,0 (0 real, 0 imaginary) and input A1 (or B1) is 1,0 (1 real, 0 imaginary), the output of the Logic Complex Multiply (LCM) operation would be 00, 01, where the real portion 00 corresponds to a real portion of 0 and the imaginary part 01 corresponds to an imaginary portion of +1/2.

As depicted in FIG. 2, the output of the first and second multipliers 210, 220 is provided to a summer 230 that subtracts the output of multiplier 210 from that of multiplier 220, and provides the subtracted sum to a summer 240. The summer 240 sums the subtracted sum with the immediately prior moving average correlation sum provided by a one sample (i.e., Δ=1) delay block 250. The operation of the of the first and second multipliers 210, 220, summers 230, 230 and delay block 250 thus performs a moving average, over a configurable window that is a guard interval in length, of the sum of the correlation between digitized samples of the received OFDM signal spaced apart from one another by a configurable number of samples corresponding to the useful symbol length ($T_U$) of the particular transmission mode being detected.

In accordance with an embodiment of the present invention in which the transmission parameter detection device 100 is adapted to receive a DVB-T Standard OFDM signal, during the first phase of the transmission parameter detection process, the correlators may be configured as follows:

Correlator 131:
Input A0: $y(n-L)$
Input A1: $y(n-N_{2K}-L)$
Input B0: $y(n)$
Input B1: $y(n-N_{2K})$
Correlator 132:
Input A0: $y(n-L)$
Input A1: $y(n-N_{8K}-L)$
Input B0: $y(n)$
Input B1: $y(n-N_{8K})$
Correlator 133:
Input A0: $y(n-L)$
Input A1: $y(n-N_{8K}-L-1)$
Input B0: $y(n)$
Input B1: $y(n-N_{8K}-1)$
Correlator 134:
Input A0: $y(n-L)$
Input A1: $y(n-N_{8K}-L+1)$
Input B0: $y(n)$
Input B1: $y(n-N_{8K}+1)$
Where:
$N_{2K}$ is the useful symbol length ($T_U$) for the 2K mode;
$N_{8K}$ is the useful symbol length ($T_U$) for the 8K mode; and
L is the guard interval length (defaulted in the first phase to 1/32).

Thus, in accordance with an embodiment of the present invention, in the first phase of the transmission parameter detection process, correlator 131 is configured to detect the 2K transmission mode, while each of correlators 132, 133, and 134 is configured to detect the 8K transmission mode, each using a minimum default guard interval of 1/32. However, in accordance with an aspect of the present invention, correlators 133 and 134 are additionally configured to detect a receiver symbol clock offset of at least one sample over one OFDM symbol relative to transmitter symbol clock of the device that transmitted the OFDM signal. Specifically, in this first phase, correlator 133 is configured to detect a receiver symbol clock that is at least one sample over one OFDM symbol behind that of the transmitter symbol clock, while correlator 134 is configured to detect a receiver symbol clock that is at least one sample over one OFDM symbol ahead of that of the transmitter symbol clock.

If the processor 110 determines that correlator 131 exhibits the strongest correlation, then the processor 110 determines that the transmission mode of the received OFDM signal is a 2K transmission mode. Alternatively, if one or more of correlators 132, 133, and 134 exhibits the strongest correlation, then the processor 110 determines that the transmission mode of the received OFDM signal is an 8K transmission mode. Further, if the processor 110 determines that correlator 133 or 134 exhibits the strongest correlation, then the processor determines that the transmission mode of the received OFDM signal is an 8K transmission mode, and further, that the receiver's symbol clock is at least one sample over one OFDM symbol lower or higher, respectively than that of the transmitter. In the event that a clock offset in the 8K transmission mode is detected, the processor 110 may provide a signal to the tuner section of the device to adjust the receiver's symbol clock, or alternatively, where the processor 110 is used to control the receiver symbol clock, the processor 110 may itself adjust the receiver symbol clock. It should be appreciated that in the 2K mode, any reasonable expected clock offset is not so large as to require detection.

In accordance with an embodiment of the present invention, after determining the transmission mode ($N_{Det.}$) in the first phase, the processor 110 may reconfigure each of the correlators 131-134 to detect the guard interval of the received OFDM signal as follows:

Correlator 131:
Input A0: $y(n-L_{1/4})$
Input A1: $y(n-N_{Det.}-L_{1/4})$
Input B0: $y(n)$
Input B1: $y(n-N_{Det.})$
Correlator 132:
Input A0: $y(n-L_{1/8})$
Input A1: $y(n-N_{Det.}-L_{1/8})$
Input B0: $y(n)$
Input B1: $y(n-N_{Det.})$
Correlator 133:
Input A0: $y(n-L_{1/6})$
Input A1: $y(n-N_{Det.}-L_{1/16})$
Input B0: $y(n)$
Input B1: $y(n-N_{Det.})$
Correlator 134:
Input A0: $y(n-L_{1/32})$
Input A1: $y(n-N_{Det.}-L_{1/32})$
Input B0: $y(n)$
Input B1: $y(n-N_{Det.})$
Where:
$N_{Det.}$ is the determined useful symbol length ($T_U$) for the transmission mode determined in the first phase;
$L_{1/4}$ is the guard interval length for a guard interval of 1/4;
$L_{1/8}$ is the guard interval length for a guard interval of 1/8;
$L_{1/16}$ is the guard interval length for a guard interval of 1/16; and
$L_{1/32}$ is the guard interval length for a guard interval of 1/32.

In this second phase of the transmission parameter detection process, correlator 131 is configured to detect a guard interval length of 1/4, while each of correlators 132, 133, and 134 is configured to detect a guard interval length of 1/8, 1/16, and 1/32, respectively, using the determined transmission mode ($N_{Det.}$) that was determined in the prior phase. If the processor 110 determines that correlator 131 exhibits the strongest correlation, then the processor determines that the guard interval of the received OFDM signal is a 1/4 guard interval. Alternatively, if one of the correlators 132, 133, and 134 exhibits the strongest correlation, then the processor 110 determines that the guard interval of the received OFDM signal is a 1/8 guard interval, a 1/16 guard interval, or a 1/32 guard interval, respectively.

In accordance with an embodiment of the present invention, the transmission parameter detection process may include a third phase in which one of the correlators 131-134 is configured to the transmission mode and guard interval determined in the first and second phases. This third phase may provide a metric that may subsequently be used by the moving average filter 150 (FIG. 1) to determine a coarse FFT window position for use in evaluating the symbols of the received OFDM signal. In this third phase, one of correlators, for example, correlator 133 may be configured as follows:

Correlator 133:
Input A0: $y(n-L_{Det.})$
Input A1: $y(n-N_{Det.}-L_{Det.})$
Input B0: $y(n)$
Input B1: $y(n-N_{Det.})$ Where:
$N_{Det.}$ is the useful symbol length ($T_U$) for the transmission mode determined in the first phase; and
$L_{Det.}$ is the guard interval length for the guard interval determined in the second phase.

It should be appreciated that any one of the configurable correlators 131-134 may be reconfigured in the third phase of the process, or alternatively, the configurable correlator corresponding to the determined guard interval may be used in the third phase, without reconfiguration.

Figure 3:
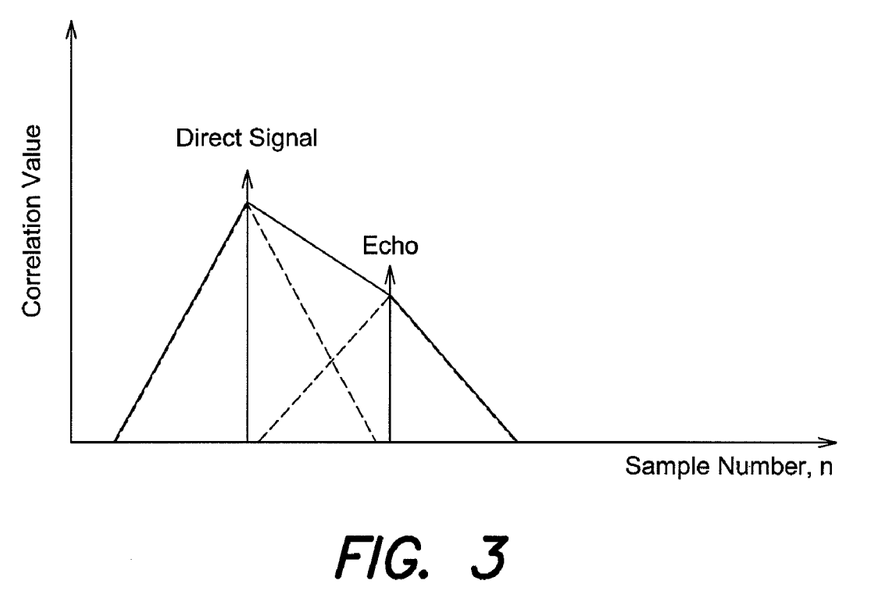
FIG. 3 illustrates the output of one of the configurable correlators during a phase of a transmission parameter detection process and which can be used by the device of FIG. 1 to determine a coarse FFT window position.

FIG. 3 is a functional illustration of the output of the correlator 133 during the third phase of the transmission parameter detection process. As depicted in FIG. 3, the output of the correlator 133 comprises a series of roughly triangularly shaped peaks (indicated by dotted lines) representing receipt of the main signal and any echoes at the receiver due to the multipath environment of the transmission media over which the OFDM signal was received. In FIG. 3, the main (i.e., direct) signal is indicated along with an echo of lesser power. In order to take advantage of the useful energy of the echoes, an OFDM receiver needs to determine the optimum window of time in which to perform an FFT on the OFDM signal to decode the frequency division multiplex data. In accordance with an embodiment of the present invention, a moving average filter is provided that performs multiple moving averages of the output of the correlator over differently sized windows. Based upon an analysis of the multiple moving averages, a coarse estimate of the correct start time for the FFT window may be provided. This coarse estimate may then be used in accordance with a pulse estimation response of the channel, such as described in the co-pending application, to determine an optimal placement of the FFT window on the useful part of a symbol so that all, or nearly all, echo energy lies within the guard interval of the symbol.

Figure 4:
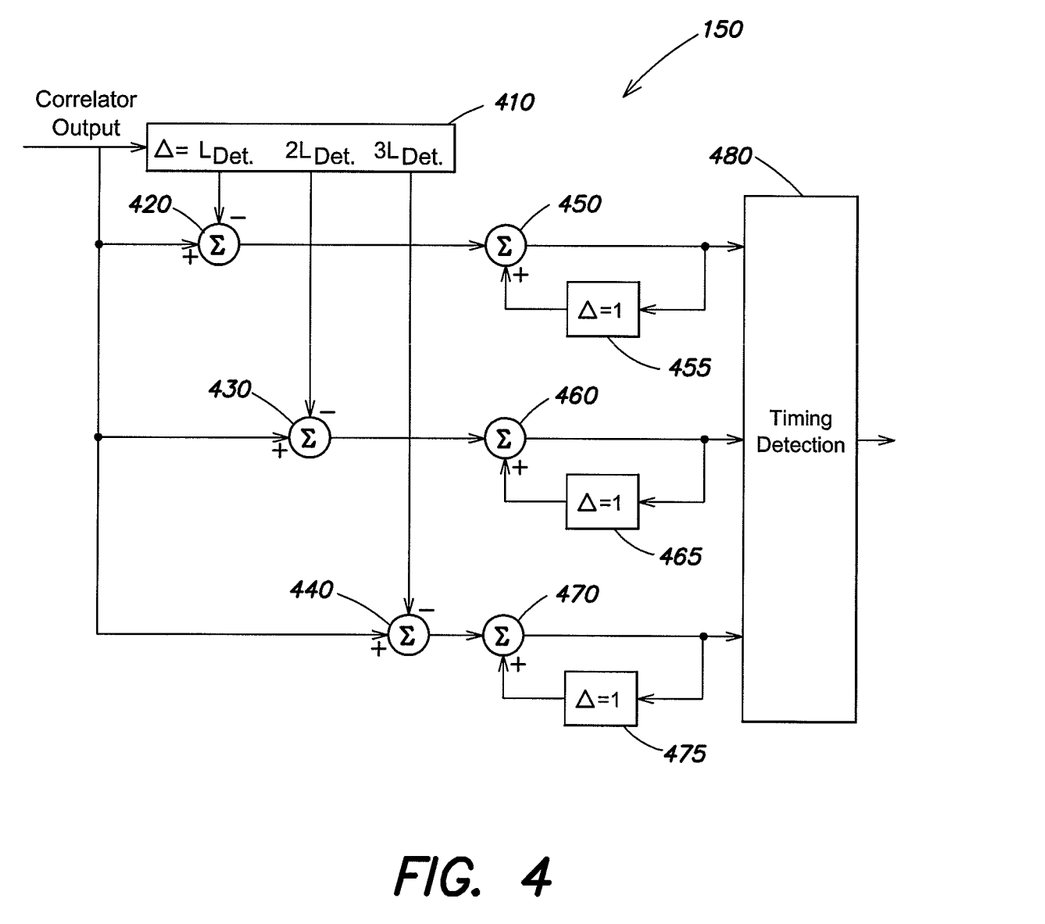
FIG. 4 is an exemplary functional implementation of a moving average filter that may be used to determine the coarse FFT window position in the transmission parameter detection device of FIG. 1.

FIG. 4 illustrates an exemplary moving average filter 150 in accordance with one embodiment of the present invention which may be used to determine a coarse FFT window position based upon the output of the correlator 133 determined in the third phase of the process. In overview, the moving average filter 150 performs a number of moving averages of the output of the correlator, over a corresponding number of windows of different sizes, to provide a corresponding number of different metrics from which a coarse FFT window position may be determined. In accordance with one embodiment, the output of the correlator is averaged over a first window that is a guard interval in length, over a second window that is two guard intervals in length, and over a third window that is three guard intervals in length to provide three different metrics indicative of a very good coarse FFT window position. Where little multipath distortion is present and any appreciable echoes of the main signal are confined to an interval relatively close to the main signal, and/or where the power of the echo is relatively high in comparison to the main transmission path, the moving average determined over the shorter (e.g., the one guard length) interval will provide a lower variance estimate for the FFT window position. However, the moving average determined over the shorter interval can become inaccurate where echoes of the main signal approach (or even exceed) a guard interval in length from the main signal and/or where the power of the echo is low in comparison to the main transmission path. Thus, where echoes of the main signal approach or even exceed a guard interval in length from the main signal, and/or where the power of the echo is low in comparison to the main transmission path, the moving average determined over the longer (e.g., the three guard length) interval can provide a better estimate for the FFT window position than the moving average determined over the shorter interval, albeit with a higher variance. This aspect is now described with respect to FIGS. 6A and 6B.

Figure 6A:
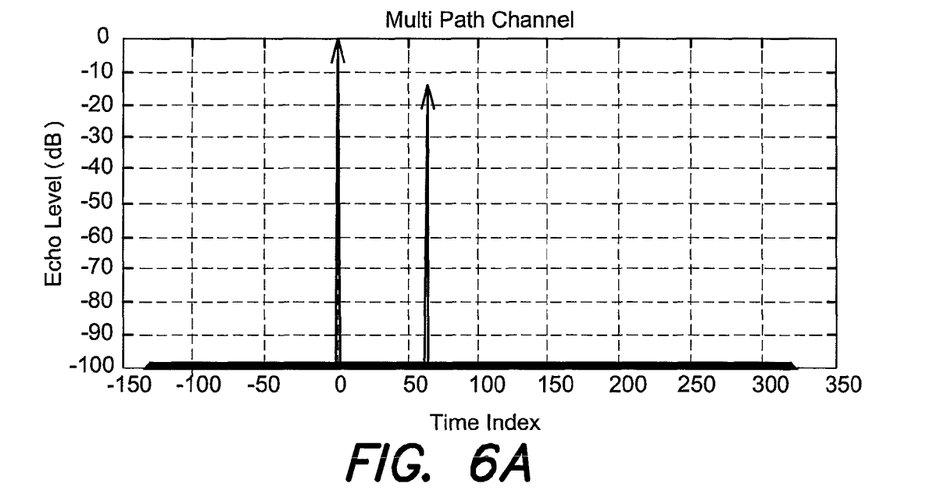
FIG. 6A illustrates the receipt of a direct OFDM signal at time index zero and a post echo of the direct signal received with reduced power at time index 64.
Figure 6B:
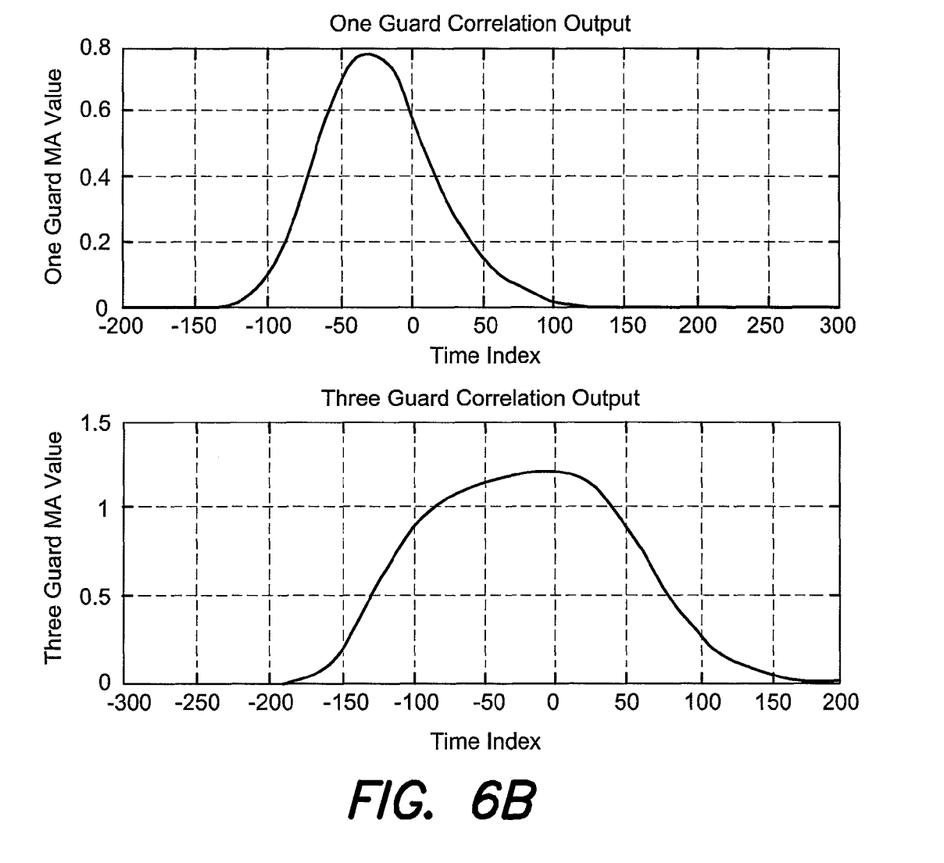
FIG. 6B illustrates a moving average of the output of the correlator configured to the determined mode of the OFDM signal and to the determined guard interval of the OFDM signal of FIG. 6A over a window that is one guard interval in length and over a window that is three guard intervals in length during a third phase of the transmission parameter detection process.

FIGS. 6A and 6B graphically illustrate the receipt of a direct OFDM signal and a post echo of the direct signal and the resulting moving averages of the output of the correlator performed over a window that is one guard interval in length and over a window that is three guard intervals in length during a third phase of the transmission parameter detection process of the present invention. As depicted in FIG. 6A, a direct signal is received at time index zero and a post echo of the direct signal is received with reduced power (approximately 14 dB less power than the direct signal) at time index 64 (where 64 index locations correspond to the length of the guard interval). FIG. 6B illustrates the output of the correlator 133 averaged over a window that is one guard interval in length (top), and over a window that is three guard intervals in length (bottom) during a third phase of the transmission parameter detection process.

As illustrated, the output of the correlator averaged over a window that is one guard interval in length generates a relatively low variance maximum at index location −32, whereas the true location of the echo is at index location 0. The output of the correlator averaged over a window that is three guard intervals in length generates a maximum in the vicinity of the true index location 0, albeit with higher variance (e.g., the index location of the maximum value is less clearly defined). As can be seen in FIG. 6B, where appreciable echoes of a main signal approach or even exceed a guard interval in length, the moving average of the output of the correlator determined over the longer interval (e.g., a three guard length interval) provides a better estimate of the echo's true location, and thus, permits a better estimate of where the FFT window should be placed so that all meaningful echo energy lies within the guard interval of a symbol.

As depicted in FIG. 4, in one embodiment in which the moving average filter 150 is implemented predominantly in hardware, the moving average filter 150 includes a configurable delay memory 410, a plurality of summers 420, 430, 440, 450, 460, and 470, a plurality of delay blocks 455, 465, and 475, and a timing detection device 480. The plurality of summers 420-470 and the plurality of delay blocks 455-475 may be implemented in hardware as a dedicated arithmetic circuit or module, or by instructions executed by the processor 110 of FIG. 1. During the third phase, the output of the correlator is provided to an input of the delay memory 410 which acts as a First-In First-Out (FIFO) delay device having a number of taps or outputs. The delay memory 410 delays the output of the correlator by a determined number of samples corresponding to a length of the determined guard interval ($L_{Det.}$), twice the length of the determined guard interval ($2L_{Det.}$), and three times the length of the determined guard interval ($3L_{Det.}$). Each of summers 420, 430, and 440 receives the output of the correlator and subtracts from it the output of the correlator delayed by $L_{Det.}$, $2L_{Det.}$, and $3L_{Det.}$, respectively, and provides the respective subtracted sum to each of summers 450, 460, and 470 respectively. Each of summers

450, 460, and 470 respectively sums the respective subtracted sum with an immediately prior moving average correlation sum provided by a one sample (i.e., Δ=1) delay block 455, 465, and 475. In operation, the output of summer 450 provides a moving average of the output of the correlator over a window that is the determined guard interval in length, with the output of summers 460 and 470 each providing a moving average of the output of the correlator over a window that is twice the determined guard interval in length, and over a window that is three times the determined guard interval in length, respectively.

The output of each of the summers 450, 460, and 470 is provided to a timing detection device 480, which in one embodiment may be implemented by the processor 110 of FIG. 1. The timing detection device 480 analyzes each of the moving averages to determine which of the moving averages upon which to base the coarse FFT window position. For example, the location of the maximum of the moving average determined over each of the three different windows may be statistically compared to one another to determine which of the maxima should be used. Where, for example, the location of maximum correlation determined over the one guard length interval generally corresponds to the locations of the maxima determined over the longer intervals, the location determined over the one guard length interval may be adopted, as it will provide a lower variance estimate. Alternatively, where the location of maximum correlation determined over the one guard length interval does not statistically correspond to the locations of the maxima determined over the longer intervals, the location determined over the one of the longer intervals may be adopted. Thus, for example, where the location of maximum correlation determined over the two guard length interval statistically corresponds with the location determined over the three guard length interval but not the location determined over the one guard length interval, the location determined over the two guard length interval may be adopted, and when none of the locations of maximum correlation statistically correspond with one another, the maximum correlation determined over the three guard length interval may be adopted. Although adoption of the location of maximum correlation determined over the three guard length interval is likely to provide a less accurate estimate for the FFT window location than that based upon either the two guard length interval or the one guard length interval, it is less like to mis-identify the region of maximum correlation. Upon adopting a location of maximum correlation based upon one of the moving averages, the timing detection device 480 can utilize this information to provide a coarse FFT window position based thereon.

Figure 5:
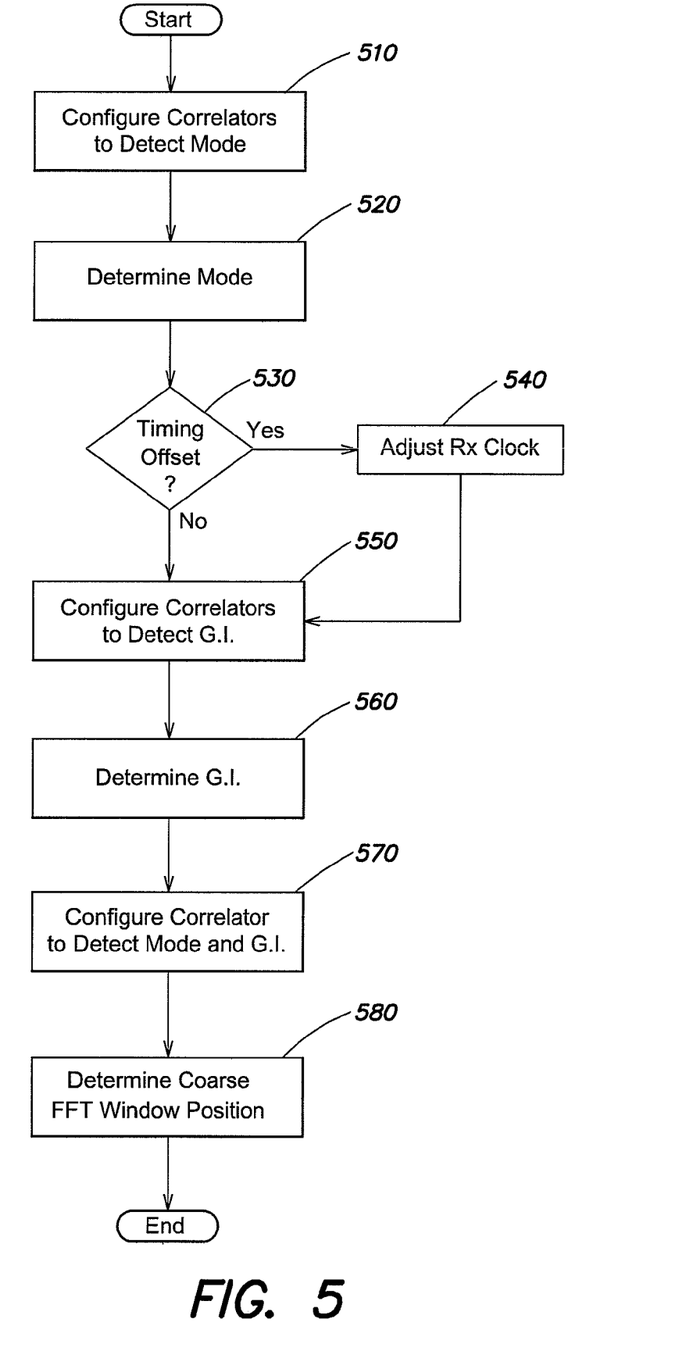
FIG. 5 is a flow chart illustrating steps which may be performed by the transmission parameter detection device of FIG. 1 to determine the transmission mode, the guard length, and a coarse FFT window position in accordance with an embodiment of the present invention.

FIG. 5 illustrates an exemplary flow chart depicting the steps or acts that may be performed during the transmission parameter detection process in accordance with an embodiment of the present invention which may be implemented by the processor 110 of FIG. 1 to determine the transmission mode and the guard interval of a received OFDM signal, and to determine a coarse FFT window position based thereon. In a first step or act 510, the processor 110 configures each of the correlators 131-134 to detect the transmission mode of the received OFDM signal. As described previously with respect to FIGS. 1 and 2, this may be done by configuring correlator 131 to detect the 2K transmission mode, and by configuring each of correlators 132, 133, and 134 to detect the 8K transmission mode, each using a minimum default guard interval (e.g., a guard interval of 1/32).

In a next step or act 520, the processor 110 examines each of the metrics provided by each of the correlators 131-134 to determine which of the metrics exhibits the strongest correlation. In one embodiment, to determine which of the correlators exhibits the strongest correlation, the processor 110 may perform a search operation on the output of each correlator to identify the location of maximum correlation within each OFDM symbol and then compute an average of the maximum value for several OFDM symbols for each correlator. If, in act 520, the processor 110 determines that correlator 131 exhibits the strongest correlation (e.g., corresponds to the highest average), then the processor 110 determines that the transmission mode of the received OFDM signal is a 2K transmission mode and may proceed directly to act 550. Alternatively, if one or more of correlators 132, 133, and 134 exhibits the strongest correlation, then the processor 110 determines that the transmission mode of the received OFDM signal is an 8K transmission mode and proceeds to act 530.

In act 530, the processor 110 determines, based upon the metrics previously provided by the correlators 132-134, whether there is a clock offset between the receiver's symbol clock and that of the transmitter. For example, if the processor 110 determines that correlator 132 exhibits the strongest correlation, then it is determined that there is no appreciable clock offset, and the processor 110 proceeds to act 550. Alternatively, if in act 530, the processor 110 determines that one of correlators 133 and 134 exhibits the strongest correlation, then it is determined that there is a clock offset, and the processor proceeds to act 540.

In act 540, the processor 110 either sends a signal to another device (such as another processor associated with the receiver section of the device) to adjust the receiver symbol clock by one sample over one OFDM symbol based upon the detected timing offset, or, where the processor 110 may itself control the receiver symbol clock, the processor 110 adjusts the receiver's symbol clock to account for the detected offset. After having determined the transmission mode of the received OFDM signal and having corrected for any clock offset, the processor 110 proceeds to act 550.

In act 550 the processor 110 configures each of the correlators 131-134 to detect the guard interval of the received OFDM signal, based upon the transmission mode determined in act 520. As described previously with respect to FIGS. 1 and 2, this may be done by configuring correlator 131 to detect a guard interval length of ¼, while configuring each of correlators 132, 133, and 134 to detect a guard interval length of ⅛, 1/16, and 1/32, respectively, each using the determined transmission mode ($N_{Det}$) that was determined previously.

In act 560, the processor 110 examines each of the metrics provided the correlators 131-134 to determine which of the metrics exhibits the strongest correlation. In one embodiment, to determine which of the correlators exhibits the strongest correlation, the processor 110 again performs a search operation on the output of each correlator to identify the location of maximum correlation within each OFDM symbol, and computes an average of the maximum value for several OFDM symbols for each correlator. However, because each of the correlators 131-134 will typically exhibit a relatively high degree of correlation, the processor 110 further computes a normalized average of the maximum value for several OFDM symbols for each correlator, and selects the correlator corresponding to the highest normalized average value as exhibiting the strongest correlation.

If, in act 560, the processor 110 determines that correlator 131 exhibits the strongest correlation, then the processor 110 determines that the guard interval of the received OFDM signal is a ¼ guard interval. Alternatively, if one of the correlators 132, 133, and 134 exhibits the strongest correlation, then the processor 110 determines that the guard interval of the received OFDM signal is a ⅛ guard interval, a 1/16 guard interval, or a 1/32 guard interval, respectively.

After determining both the transmission mode and the guard interval of the received OFDM signal, the processor proceeds to act 570, wherein the processor 110 configures one of the correlators 131-134 to the determined transmission mode and the determined guard interval. It should be appreciated that in act 570, the processor 110 may alternatively configure one of the correlators to the determined transmission mode and a moving average window size of less than the determined guard interval, for example one half the guard interval. By configuring the one of the correlators in the third phase to utilize less than the determined guard interval, it may be possible to more accurately determine the location for the coarse FFT window position. In accordance with one embodiment, the one correlator configured in the third phase of the transmission parameter detection process may utilize the same digitized sampled data that was utilized during the first and second phases.

In act 580, and based upon the output of the correlator during the third phase of the process, the processor 110 may determine a coarse location of the FFT window position based upon the plurality of moving averages over windows of different lengths provided by each of summers 450, 460, and 470, and the output of the correlator.

In the description of FIGS. 1-6B above, transmission parameter detection was described primarily with respect to detecting the transmission parameters of a DVB-T Standard OFDM signal. However, it should be appreciated that the present invention is not so limited, and may be used to detect the transmission parameters of other types of OFDM signals and systems. For example, if it were desired to detect an additional transmission mode, such as a 4K mode used by DVB-H Standard systems, an additional correlator (e.g., correlator 13n in FIG. 1) could be provided to detect this mode during the first phase of the process. Although any reasonable expected clock offset in a 4K mode transmission could be expected to be less than one sample over one OFDM symbol, multiple correlators could be used in a manner analogous to that described with respect to correlators 132, 133, and 134 during the first phase of the transmission parameter detection process to detect a clock offset between the receiver's symbol clock and that of the transmitter in the 4K transmission mode.

Similarly, for use with other types of OFDM signals and systems, such as DAB Standard signals and systems, the correlators 131-134 could be configured to detect the 2K mode, the 1K mode, the 0.5K mode, and the 0.25K mode, respectively. In such a system, again only four configurable correlators may be used, with a first (e.g., correlator 131) detecting the 2K mode, the second (e.g., correlator 132) detecting the 1K mode, the third (e.g., correlator 133) detecting the 0.5K mode, and the fourth (e.g., correlator 134) detecting the 0.25K mode, as any reasonable expected clock offset in even the 2K mode can be expected to be less than one sample over one OFDM symbol. Advantageously, such a system may be used to identify the mode of the DAB Standard OFDM signal much more quickly than conventional DAB Standard systems utilizing mode detection based upon the Null symbol (described in ETSI EN300401), because the mode detection of the present invention operates at the OFDM symbol level of granularity, whereas mode detection based upon the Null symbol operates at a frame level of granularity.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention. Accordingly, the foregoing description and drawings are by way of example only.

What is claimed is:

1. A system for identifying transmission parameters of an OFDM signal transmitted in accordance with a transmitter clock, the system comprising:
   a first correlator to receive and correlate samples of the OFDM signal sampled in accordance with a receiver clock and to provide a first metric indicative of whether the OFDM signal has a first transmission mode of a plurality of permissible transmission modes for the OFDM signal;
   a plurality of additional correlators, operable in parallel with the first correlator, to receive and correlate the samples of the OFDM signal sampled in accordance with the receiver clock and to provide a plurality of additional metrics indicative of whether the OFDM signal has a second transmission mode of the plurality of permissible transmission modes for the OFDM signal, the plurality of additional correlators including a first additional correlator to provide a first additional metric indicative of whether the OFDM signal has the second transmission mode and the receiver clock is aligned with the transmitter clock, and at least one second additional correlator to provide at least one second additional metric indicative of whether the OFDM signal has the second transmission mode and the receiver clock is displaced by at least one sample over one OFDM symbol relative to the transmitter clock; and
   a processor configured to receive the first metric and the plurality of additional metrics, and based upon the first metric and the plurality of additional metrics, to determine whether the OFDM signal has one of the first transmission mode or the second transmission mode, and when the OFDM signal has the second transmission mode, to additionally determine whether the receiver clock is the one of aligned with the transmitter clock or displaced by the at least one sample over one OFDM symbol relative to the transmitter clock.

2. The system of claim 1, wherein the processor, in response to a determination that the receiver clock is displaced by the at least one sample over one OFDM symbol relative to the transmitter clock, is further configured to provide a signal to adjust the receiver clock by the at least one sample over one OFDM symbol to align the receiver clock with the transmitter clock.

3. The system of claim 1, wherein the processor is configured to reconfigure, based upon the determined transmission mode, the first correlator to receive and correlate the samples of the OFDM signal according to the determined transmission mode and a first guard interval of a plurality of permissible guard intervals for the OFDM signal.

4. The system of claim 3, wherein the processor is further configured to reconfigure, based upon the determined transmission mode, at least one of the plurality of additional correlators to receive and correlate the samples of the OFDM signal according to the determined transmission mode and a second guard interval of the plurality of permissible guard intervals for the OFDM signal that is different than the first guard interval.

5. A system for identifying transmission parameters of an OFDM signal transmitted in accordance with a transmitter clock, the system comprising:
   a first correlator to receive and correlate samples of the OFDM signal sampled in accordance with a receiver clock and to provide a first metric indicative of whether the OFDM signal has a first transmission mode of a plurality of permissible transmission modes for the OFDM signal;

a plurality of additional correlators, operable in parallel with the first correlator, to receive and correlate the samples of the OFDM signal sampled in accordance with the receiver clock and to provide a plurality of additional metrics indicative of whether the OFDM signal has a second transmission mode of the plurality of permissible transmission modes for the OFDM signal and whether the receiver clock is one of aligned with the transmitter clock or displaced by at least one sample over one OFDM symbol relative to the transmitter clock; and a processor configured to receive the first metric and the plurality of additional metrics, and based upon the first metric and the plurality of additional metrics, to determine whether the OFDM signal has one of the first transmission mode or the second transmission mode, and when the OFDM signal has the second transmission mode, to additionally determine whether the receiver clock is the one of aligned with the transmitter clock or displaced by the at least one sample over one OFDM symbol relative to the transmitter clock;

wherein the plurality of additional correlators includes:

a second correlator, to receive and correlate samples of the OFDM signal sampled in accordance with the receiver clock and to provide a second metric indicative of whether the OFDM signal has the second transmission mode and whether the receiver clock is aligned with the transmitter clock;

a third correlator, to receive and correlate the samples of the OFDM signal sampled in accordance with the receiver clock but offset the at least one sample over one OFDM symbol ahead of the samples of the OFDM signal received and correlated by the second correlator and to provide a third metric indicative of whether the OFDM signal has the second transmission mode and whether the receiver clock is displaced the at least one sample over one OFDM symbol ahead of the transmitter clock; and a fourth correlator, to receive and correlate the samples of the OFDM signal sampled in accordance with the receiver clock but offset the at least one sample over one OFDM symbol behind the samples of the OFDM signal received and correlated by the second correlator and to provide a fourth metric indicative of whether the OFDM signal has the second transmission mode and whether the receiver clock is displaced the at least one sample over one OFDM symbol behind the transmitter clock.

6. The system of claim 5, wherein the OFDM signal includes a plurality of symbols, wherein the processor calculates an average of a maximum value of each of the first metric, the second metric, the third metric, and the fourth metric over the plurality of symbols, and wherein the processor determines whether the OFDM signal has the one of the first transmission mode or the second transmission mode based upon which of the first metric, the second metric, the third metric, and the fourth metric has the highest average maximum value.

7. The system of claim 6, wherein the first, second, third, and fourth correlators are configurable correlators.

8. The system of claim 7, wherein the processor is configured to receive the first metric, the second metric, the third metric, and the fourth metric, to determine whether the OFDM signal has the one of the first transmission mode or the second transmission mode, and based upon the determined transmission mode, to reconfigure the first configurable correlator to receive and correlate the samples of the OFDM signal according to the determined transmission mode and to provide a fifth metric indicative of whether the OFDM signal has a first guard interval of a plurality of permissible guard intervals for the OFDM signal, and to reconfigure the second configurable correlator to receive and correlate the samples of the OFDM signal according to the determined transmission mode and to provide a sixth metric indicative of whether the OFDM signal has a second guard interval of the plurality of permissible guard intervals for the OFDM signal.

9. The system of claim 8, wherein the processor reconfigures the second configurable correlator to receive and correlate the samples of the OFDM signal according to the determined transmission mode in parallel with the receipt and correlation performed by the first configurable correlator.

10. The system of claim 9, wherein the processor is further configured to reconfigure the third configurable correlator to receive and correlate, in parallel with the first and second configurable correlators, the samples of the OFDM signal according to the determined transmission mode and to provide a seventh metric indicative of whether the OFDM signal has a third guard interval of a plurality of permissible guard intervals for the OFDM signal, and to reconfigure the fourth configurable correlator to receive and correlate, in parallel with the first, second, and third configurable correlators, the samples of the OFDM signal according to the determined transmission mode and to provide a eighth metric indicative of whether the OFDM signal has a fourth guard interval of the plurality of permissible guard intervals for the OFDM signal.

11. The system of claim 10, wherein the processor is further configured to receive the fifth metric, the sixth metric, the seventh metric, and the eighth metric and to determine whether the OFDM signal has one of the first guard interval, the second guard interval, the third guard interval, or the fourth guard interval.

12. The system of claim 11, wherein the OFDM signal includes a plurality of symbols, wherein:

the processor calculates an average of a maximum value of each of the fifth metric, the sixth metric, the seventh metric, and the eighth metric over the plurality of symbols;

the processor calculates a standard deviation of a maximum value index corresponding to the maximum value of each of the fifth metric, the sixth metric, the seventh metric, and the eighth metric over the plurality of symbols;

the processor calculates a normalized average value of each of the fifth metric, the sixth metric, the seventh metric, and the eighth metric over the plurality of symbols based upon the average of the maximum value of a respective metric divided by the standard deviation of the maximum value index of the respective metric; and the processor determines whether the OFDM signal has one of the first guard interval, the second guard interval, the third guard interval, or the fourth guard interval based upon which of the first metric, the second metric, the third metric, and the fourth metric has the highest normalized average value.

13. The system of claim 11, wherein, after determining whether the OFDM signal has the one of the first transmission mode or the second transmission mode, and whether the OFDM signal has the one of the first guard interval, the second guard interval, the third guard interval, or the fourth guard interval, the processor is further configured to reconfigure one of the first, second, third, and fourth configurable correlators to receive and correlate the samples of the OFDM signal according to the determined transmission mode and the determined guard interval.

14. The system of claim 13, wherein the one of the first, second, third, and fourth configurable correlators is reconfigured to receive the samples of the OFDM signal at a first input, to receive the samples of the OFDM signal delayed by a length of a useful symbol duration corresponding to the determined transmission mode at a second input, to receive the samples of the OFDM signal delayed by a length of the determined guard interval duration at a third input, and to receive the samples of the OFDM signal delayed by the length of the useful symbol duration and the length of the determined guard interval duration at a fourth input, and to provide an output signal indicative of a correlation among the samples of the OFDM signal during a sample period.

15. The system of claim 14, further comprising:
a delay memory, coupled to receive the output signal of the correlator, to delay the output signal of the correlator by the length of the determined guard interval duration, by twice the length of the determined guard interval duration, and by three times the length of the determined guard interval duration and provide respective delayed output signals corresponding thereto; and module to receive the output signal of the correlator and the respective delayed output signals of the delay memory, and determine a first average of a sum of the output signal of the correlator and the output signal of the correlator delayed by the length of the determined guard interval duration, a second average of a sum of the output signal of correlator and the output signal of the correlator delayed by twice the length of the determined guard interval duration, and a third average of a sum of the output signal of the correlator and the output signal of the correlator delayed by three times the length of the determined guard interval duration;
wherein the processor is further configured to receive the first, second and third averages and determine an approximate FFT window location to extract data from the OFDM signal based upon a maximum of the first, second, and third averages.

16. A method for identifying transmission parameters of an OFDM signal transmitted in accordance with a transmitter clock, the OFDM signal having a transmission mode selected from among a plurality of permissible transmission modes, the method comprising acts of:
(a) correlating samples of the OFDM signal sampled in accordance with a receiver clock to provide a first metric indicative of whether the OFDM signal has a first transmission mode of the plurality of permissible transmission modes;
(b) correlating the samples of the OFDM signal sampled in accordance with the receiver clock to provide a plurality of additional metrics indicative of whether the OFDM signal has a second transmission mode of the plurality of permissible transmission modes, the plurality of additional metrics including a first additional metric indicative of whether the OFDM signal has the second transmission mode and the receiver clock is aligned with the transmitter clock, and at least one second additional metric indicative of whether the OFDM signal has the second transmission mode and the receiver clock is displaced by at least one sample over one OFDM symbol relative to the transmitter clock; and
(c) determining, based upon the first metric and the plurality of additional metrics, whether the OFDM signal has one of the first transmission mode or the second transmission mode, and when the OFDM signal has the second transmission mode, additionally determining whether the receiver clock is the one of aligned with the transmitter clock or displaced by the at least one sample over one OFDM symbol relative to the transmitter clock;
wherein the acts (a) and (b) are performed in parallel with one another.

17. The method of claim 16, further comprising an act of:
adjusting, in response to a determination that the receiver clock is displaced by the at least one sample over one OFDM symbol relative to the transmitter clock, the receiver clock by the at least one sample over one OFDM symbol to align the receiver clock with the transmitter clock.

18. The method of claim 16, wherein the act (a) is performed by a first configurable correlator, the method further comprising an act of:
reconfiguring, responsive to a determination in act (c) that the OFDM signal has a determined one of the first transmission mode or the second transmission mode, the first configurable correlator to correlate the samples of the OFDM signal according to the determined transmission mode and a first guard interval of a plurality of permissible guard intervals for the OFDM signal.

19. The method of claim 18, wherein the act (b) is performed by a plurality of additional correlators, the method further comprising an act of:
reconfiguring, responsive to the determination in act (c) that the OFDM signal has the determined one of the first transmission mode or the second transmission mode, at least one of the plurality of additional correlators to correlate, in parallel with the first correlator, the samples of the OFDM signal according to the determined transmission mode and a second guard interval of the plurality of permissible guard intervals for the OFDM signal that is different than the first guard interval.

20. A method for identifying transmission parameters of an OFDM signal transmitted in accordance with a transmitter clock, the OFDM signal having a transmission mode selected from among a plurality of permissible transmission modes, the method comprising acts of:
(a) correlating samples of the OFDM signal sampled in accordance with a receiver clock to provide a first metric indicative of whether the OFDM signal has a first transmission mode of the plurality of permissible transmission modes;
(b) correlating the samples of the OFDM signal sampled in accordance with the receiver clock to provide a plurality of additional metrics indicative of whether the OFDM signal has a second transmission mode of the plurality of permissible transmission modes and whether the receiver clock is one of aligned with the transmitter clock or displaced by at least one sample over one OFDM symbol relative to the transmitter clock; and
(c) determining, based upon the first metric and the plurality of additional metrics, whether the OFDM signal has one of the first transmission mode or the second transmission mode, and when the OFDM signal has the second transmission mode, additionally determining whether the receiver clock is the one of aligned with the transmitter clock or displaced by the at least one sample over one OFDM symbol relative to the transmitter clock;
wherein the acts (a) and (b) are performed in parallel with one another; and
wherein the act (b) includes acts of:
(d) correlating the samples of the OFDM signal sampled in accordance with the receiver clock to provide a second metric indicative of whether the OFDM signal has the second transmission mode and whether the receiver clock is aligned with the transmitter clock;

(e) correlating the samples of the OFDM signal sampled in accordance with the receiver clock but offset the at least one sample over one OFDM symbol ahead of the samples of the OFDM signal correlated in act (d) to provide a third metric indicative of whether the OFDM signal has the second transmission mode and whether the receiver clock is displaced the at least one sample over one OFDM symbol ahead of the transmitter clock; and (f) correlating the samples of the OFDM signal sampled in accordance with the receiver clock but offset the at least one sample over one OFDM symbol behind the samples of the OFDM signal correlated in act (d) to provide a fourth metric indicative of whether the OFDM signal has the second transmission mode and whether the receiver clock is displaced the at least one sample over one OFDM symbol behind the transmitter clock.

21. The method of claim 20, wherein the OFDM signal includes a plurality of symbols, and wherein the act (c) includes acts of:
calculating an average of a maximum value of each of the first metric, the second metric, the third metric, and the fourth metric over the plurality of symbols; and
determining whether the OFDM signal has the one of the first transmission mode or the second transmission mode based upon which of the first metric, the second metric, the third metric, and the fourth metric has the highest average maximum value.

22. The method of claim 20, wherein the acts (a), (d), (e), and (f) are performed by first, second, third, and fourth configurable correlators, respectively, the method further comprising an act of reconfiguring, responsive to a determination in act (c) that the OFDM signal has a determined one of the first transmission mode or the second transmission mode:
the first configurable correlator to correlate the samples of the OFDM signal according to the determined transmission mode and to provide a fifth metric indicative of whether the OFDM signal has a first guard interval of a plurality of permissible guard intervals for the OFDM signal;
the second configurable correlator to correlate, in parallel with the first correlator, the samples of the OFDM signal according to the determined transmission mode and to provide a sixth metric indicative of whether the OFDM signal has a second guard interval of the plurality of permissible guard intervals for the OFDM signal;
the third configurable correlator to correlate, in parallel with the first and second configurable correlators, the samples of the OFDM signal according to the determined transmission mode and to provide a seventh metric indicative of whether the OFDM signal has a third guard interval of a plurality of permissible guard intervals for the OFDM signal; and
the fourth configurable correlator to correlate, in parallel with the first, second, and third configurable correlators, the samples of the OFDM signal according to the determined transmission mode and to provide a eighth metric indicative of whether the OFDM signal has a fourth guard interval of the plurality of permissible guard intervals for the OFDM signal.

23. The method of claim 22, further comprising an act of:
determining, based upon the fifth metric, the sixth metric, the seventh metric, and the eighth metric whether the OFDM signal has one of the first guard interval, the second guard interval, the third guard interval, or the fourth guard interval.

24. The method of claim 23, wherein the OFDM signal includes a plurality of symbols, and wherein the act of determining whether the OFDM signal has the one of the first guard interval, the second guard interval, the third guard interval, or the fourth guard interval includes acts of:
calculating an average of a maximum value of each of the fifth metric, the sixth metric, the seventh metric, and the eighth metric over the plurality of symbols;
calculating a standard deviation of a maximum value index corresponding to the maximum value of each of the fifth metric, the sixth metric, the seventh metric, and the eighth metric over the plurality of symbols;
calculating a normalized average value of each of the fifth metric, the sixth metric, the seventh metric, and the eighth metric over the plurality of symbols based upon the average of the maximum value of a respective metric divided by the standard deviation of the maximum value index of the respective metric; and
determining whether the OFDM signal has the one of the first guard interval, the second guard interval, the third guard interval, or the fourth guard interval based upon which of the first metric, the second metric, the third metric, and the fourth metric has the highest normalized average value.

25. The method of claim 23, further comprising an act of:
reconfiguring, responsive to a determination that the OFDM signal has a determined one of the first guard interval, the second guard interval, the third guard interval, or the fourth guard interval, one of the first, second, third, and fourth configurable correlators to correlate the samples of the OFDM signal according to the determined transmission mode and the determined guard interval.

26. The method of claim 25, further comprising acts of:
receiving, responsive to the act of reconfiguring the one of the first, second, third, and fourth configurable correlators to correlate the samples of the OFDM signal according to the determined transmission mode and the determined guard interval, a correlated output signal of the one of the first, second, third, and fourth configurable correlators;
delaying the correlated output signal by a length of a duration of the determined guard interval, by twice the length of the duration of the determined guard interval, and by three times the length of the duration of the determined guard interval to provide respective delayed output signals corresponding thereto;
determining a first average of a sum of the output signal of the correlator and the output signal of the correlator delayed by the length of the determined guard interval duration, a second average of a sum of the output signal of correlator and the output signal of the correlator delayed by twice the length of the determined guard interval duration, and a third average of a sum of the output signal of the correlator and the output signal of the correlator delayed by three times the length of the determined guard interval duration; and
determining an approximate FFT window location to extract data from the OFDM signal based upon a maximum of the first, second, and third averages.

* * * * *